United States Patent [19]

Angelo et al.

[11] 3,791,027

[45] Feb. 12, 1974

[54] SOLDERING METHOD

[75] Inventors: Raymond William Angelo; Albert Lawrence Balan, both of Endwell; David Joseph Huettner, Apalachin; Richard Martin Poliak, Johnson City; John Frank Shipley, Endwell, all of N.Y.

[73] Assignee: International Business Machines Corporation, Armonk, N.Y.

[22] Filed: June 30, 1971

[21] Appl. No.: 158,580

[52] U.S. Cl. ................................. 29/495, 148/23
[51] Int. Cl. ...................... B23k 31/02, B23k 35/36
[58] Field of Search. 29/495, 496; 148/23; 260/29.1

[56] References Cited
UNITED STATES PATENTS

| | | | |
|---|---|---|---|
| 3,040,781 | 6/1962 | Reymann et al. | 29/496 X |
| 2,816,357 | 12/1957 | Henning | 29/495 |
| 2,833,030 | 5/1958 | Peaslee | 29/496 |
| 3,035,339 | 5/1962 | Malter et al. | 24/495 |
| 3,119,179 | 1/1964 | Sole | 29/495 |
| 3,264,146 | 8/1966 | Marks | 29/495 X |
| 3,376,150 | 4/1968 | Collins | 260/29.1 R X |
| 3,436,278 | 4/1969 | Poliak | 29/495 X |
| 3,488,831 | 1/1970 | Ravve | 29/495 |
| 3,507,828 | 4/1970 | Ashjian | 260/29.1 R X |
| 3,513,125 | 5/1970 | Kehr | 260/29.1 R X |
| 3,655,461 | 4/1972 | Miwa | 29/495 X |

OTHER PUBLICATIONS

Soldering Manual, prepared by American Welding Society Committee on Brazing and Soldering, copyright 1959, pp. 25–42. Art Unit Library.

IBM Technical Disclosure Blletin "Water Soluble Flux," by Carpenter et al., Vol. 11 No. 7 Dec. 1968.

*Primary Examiner*—Robert D. Baldwin
*Assistant Examiner*—Ronald J. Shore
*Attorney, Agent, or Firm*—Isidore Match

[57] ABSTRACT

There is disclosed the use of synthetic organic reactive polymer resins and other materials as soldering fluxes. These resins contain "chemical functionalities", i.e., radicals therein which provide active hydrogen for removing the oxides from the metal substrate during the soldering operation. There are essentially three types of applications as follows. The materials, distinct from known rosin fluxes, do not harden and may be easily removed with solvents. The chemical functionalities may be such that they result in resins which are thermoplastic and can remain on the solder joint to enable resoldering. Alternatively, the chemical functionalities can be chosen such that the resin fluxes chemically cross-link to form thermoset polymers which remains at the solder joint, the cross-linked polymers also functioning to reinforce the strength of the solder joint.

8 Claims, No Drawings

SOLDERING METHOD

BACKGROUND OF THE INVENTION

This invention relates to soldering fluxes and methods of soldering. More particularly, it relates to the use of fluxing materials which provide distinct advantages over those heretofore used for the same purpose.

As is well known, a flux is used in the soldering process to remove metallic oxides on the surfaces of metals to be joined by the process and to promote metallurgical wetting of the metals, i.e., the substrates. The known fluxes have generally taken two forms, i.e., inorganic and organic. Mineral acids, reducing atmospheres and halogenated salts are typical inorganic fluxes constituents. Rosin and organic acids generally provide the basis for organic fluxes.

In this latter connection, the rosin fluxes are extensively employed in printed circuit board soldering. To enhance the "reactivity" of those rosin fluxes, they are generally formulated with hydrohalide salts. It is believed that these hydrohalide salts and the mineral acid provided in inorganic fluxes provided the active hydrogen radicals which affect the removal of the metallic oxides from the surfaces of the substrate metals to be soldered.

The essential constituents of rosin are abietic and pimaric acids. The use of rosin fluxes presents a problem which leads to deleterious results. This problem is the leaving of decomposed flux film residues on the substrate metal surfaces at high soldering temperatures which result from degradative polymerization. Such film residues are not removable with cleaning solvent and the film is a source of contamination. The physical nature of this film greatly limits the use of rosin fluxes, especially in new metallurgical interconnection technologies such as large-scale integrated semiconductor circuitry, etc.

Accordingly, it is an important object of this invention to provide improved flux compositions and a method of using these flux compositions which overcomes the problems presented in the use of rosin fluxes.

It is another object to provide in accordance with the preceding object an improved soldering flux composition and method of using such composition therein. The basis of the composition is a synthetic high-polymer of a resinous nature wherein the polymer has defined chemical functionalities which contain active hydrogen, for effecting the removal of the metallic oxides from the substrate metals and for imparting desired characteristics to the resin fluxes.

It is a further object to provide an improved soldering flux composition and a method of using such composition in accordance with the preceding object herein. Because of the particular chemical functionalities contained in the synthetic polymers, organic films can be obtained through cross-linking after the soldering process to immobilize the polymeric material to thereby render it resistive to the environment and to protect the soldered joint from subsequent environmental attack.

It is still another object of this invention to provide a soldering flux composition and method as set forth in the preceding objects wherein there is enabled the formation of an organic film after the soldering process which can be compatible with the environment or by subsequent solvent washing to render it readily removed from the solder area.

It is still a further object to provide an improved soldering flux composition and method of its use wherein a synthetic polymer of a resinous nature is used and has defined chemical functionalities which are suitable either for controlled polymerization into higher molecular weight structures or are inherently resistive to subsequent polymerization whereby, the polymers, because of the high chemical functionalities are capable of utilization in low temperature solder applications or, with suitable molecular blocking, are activated at elevated temperatures.

It is yet another object to provide a soldering flux composition and method of its use as set forth in the preceding object wherein the flux melts at elevated temperatures, is active at these elevated temperatures to permit solder joint formation and then resolidifies as heat is removed to form an inert stable film material coating below its melting temperature.

SUMMARY OF THE INVENTION

In accordance with the invention, there is provided a process of soldering which comprises the use in the soldering process of a synthetic polymer resin as the flux. The polymers have chemical functionalities which provide active hydrogen for reducing metal oxides on the metal substrate which is to receive the molten solder, and to promote wettability. In addition, these chemical functionalities may be suitable either for controlled polymerization into higher molecular weight structures or may be inherently resistive to subsequent polymerization. Because of these functionalities, organic films can be obtained through cross-linking after the soldering process which immobilizes the synthetic polymer resin thereby rendering its resistive to the environment or the polymer can be solubilized by its environment or subsequent solvent washing to be removed from the solder area. Examples of chemical functionalities present in the synthetic polymers and used according to the invention are the amide, amine, carboxyl, imine, and mercaptan radicals.

The foregoing and other objects, features and advantages of the invention will be apparent from the following more particular description of the preferred embodiments of the invention.

DESCRIPTION OF A PREFERRED EMBODIMENT

It has been found, according to the invention, that synthetic polymers having defined chemical functionalities which are suitable either for controlled polymerization into higher molecular weight structures (functionalities greater than 1) or inherently resistive to subsequent polymerization (functionalities less than 1) may be used advantageously as soldering fluxes. These chemical functionalities all provide active hydrogen which thereby renders them capable of reducing metal oxides in the promotion of fusion during the soldering process. In addition, due to the defined chemical functionalities, the polymers are capable of being utilized in low temperature solder applications or, with suitable molecular blocking, at elevated temperatures.

The advantages of these polymers are that because of their functionalities, organic films can be obtained through "cross-linking" after the soldering process which immobilizes the polymer. Thereby, through such cross-linking, the polymer is rendered resistive to the environment to enable it to protect a solder joint from subsequent environmental attack. Alternatively, the polymer can be solubilized by subsequent solvent washing to remove it from the solder area. The polymer melts at elevated temperatures and is active at this temperature to thereby allow solder joint formation. The polymer then resolidifies as heat is removed to form an inert stable film material coating below its melting temperature. Examples of the chemical functionalities which, according to the invention, provide the beneficial results detailed hereinabove are radicals such as the amide, amino, carboxyl, imino, and mercaptan.

In the following tabulation, there are set forth known polymers and other materials which contain the chemical functionalities according to the invention which enable good solder wetting at the junction of substrate metals to be soldered. These tabulated polymers, and other materials were tested as fluxes and provided solder joint formation at 360°F – 550°F using eutectic tin lead solder on copper substrate (laminate structure).

| Material | Chemical Functionalities | Polymer Backbone or Molecular Structure | Results |
|---|---|---|---|
| G. M. Versamid | amide | polyamide | solder wetting |
| Fluorad FC170 | | fluorocarbon | |
| Gantrez GAF | carboxyl | maleic anhydride-vinyl ether | |
| Water | | | |
| Epon U | amine | proprietary | solder wetting |
| Epon D | amine and carboxyl | 2-ethyl hexoic acid salt of tri-dimethylamino-methyl phenol | solder wetting |
| Epon T | amine | proprietary | solder wetting |
| Epon T-1 | amine | proprietary | solder wetting |
| Epon H-3 | amine | proprietary | solder wetting |
| Emerez 3795-R | amine | polyamide | solder wetting |
| D.C. Silane 2287 | amine | siloxane | solder wetting |
| Tetrahydro-phthalic Anhydride | carboxyl | acid anhydride | solder wetting |
| Nadic Methyl Anhydride and Butyl Carbitol Solvent | carboxyl | acid anhydride | solder wetting |
| Maleic Anhydride and Butyl Curbitol Solvent | carboxyl | acid anhydride | solder wetting |
| DDSA (Dodecyl Succinic Anhydride | carboxyl | acid anhydride | solder wetting |
| Hexahydro-phthalic Anhydride | carboxyl | acid anhydride | solder wetting |
| Polyethylene-imine, PEI 600 | imine | polyethylene imine | solder wetting |
| Carboxy-terminated Polybutadiene HYSTL C 100 | carboxyl | polybutadiene | solder wetting |
| Dimercaptodi-ethylether | mercaptan | dimercaptodi-ethyl ether | solder wetting |

The functionalities set forth above in the tabulation when contained in the polymer provide effective fluxes in promoting solder joint formation, such joint formation is independent of the polymer backbone. When there are added to these polymers, other resin functionalities such as epoxide, isocyanate, etc., by addition reaction with the functionalities shown in the tabulation, effective thermosetting films may be produced. Furthermore, high molecular resins having amine functionality may be used as an effective solder flux and may be reactivated several times (not melt resins) while at ambient temperature to provide an effective barrier coating which may also add strength to the soldered joint.

As has been mentioned hereinabove, the known rosin solders harden under soldering conditions, and consequently, become difficult to remove. The following materials are examples of synthetic polymers which provide the desired chemical functionalities according to the invention and which can be used as fluxes which do not harden and which may easily be removed with solvents.

1. Carboxy terminated polybutadiene.
2. Carboxy terminated polyisobutylene.
3. Mercaptan terminated polybutadiene.
4. NMA 5–95 percent, Butyl Carbitol.
5. Ajicure (Amine).
6. EPON U.

The formulations listed below are non-cross-linking and cap remain on the solder joint. In addition, subsequent resoldering is enabled by the application of heat.

1. A mixture of various proportions of a polyamide resin and an organic carboxylic or amino acid.
2. A mixture of various proportions of an olefinic resin with an organic carboxylic or amino acid.
3. Versamid 712.
4. Versamid 930.
5. Acryloid AT70 and AT75.

In those situations where there is a low probability that a solder joint will ever be re-soldered, it is desirable to use a flux which chemically crosslinks to form a thermoset polymer which remains with the solder joint. These materials also reinforce the strength of the solder joint. Examples of suitable formulations of such fluxes are:

1. Various proportions of Hycar CTBN
   EPON 828
   DMP 30
2. Mixtures of Carboxy terminated polybutadiene and Organic peroxides
3. Various combinations of C-1000
   Ajicure
   NMA
   Butyl Carbitol
   EPON 828
   G.M. Isocyanate 1410
4. Various combinations of
   Acryloid AT70, AT75
   EPON 1001

It has been shown hereinabove that synthetic polymer resins having desired chemical functionalities, i.e., functionalities which have the capability of reducing metal oxides in promoting fusion during a soldering process and providing hydrogen therefor present distinct advantages when used as soldering fluxes as compared known rosin fluxes used for the same purpose. It also has been shown that such resins can be used in formulations to provide easily removed fluxes, thermoplastic and reusable fluxes, and thermosetting for permanent fluxes. There follows hereinbelow examples of formulations which may be employed to provide thermosetting resinous fluxes as described hereinabove.

EXAMPLE 1

Four parts by weight of Aificure LX-1 (manufactured by the Ajinomoto Co., Inc., Tokyo, Japan), which is a heterocyclic diamine having an active hydrogen equivalent 67, was mixed with three parts of Epon 815 (manufactured by the Shell Chemical Co.), which is a diglycidal ether of bisphenol-A-epoxide resin diluted with 11 percent of butyl glyicdol ether. The resultant solution was spread onto copper heated to 500°F along with a slug of 63/37 (Sn/Pb) solder. During the heating cycle, the copper surface tarnish was removed under the coating solution. The solder slug melted at its eutectic temperature (362°F) and, having been so melted, spread onto the copper surface to form metallurgical contact therewith. Upon cooling, the coating solution solidified into a thermoset non-tacky film.

Although the above quantities of constituents are shown to be efficacious for their purpose, it is to be understood that the quantities of both of the constituents can be varied within the known skill of the art to develop various resultant thermoset film physical properties, i.e., flexible vs. brittle films, longer cure cycle, more impact resistance, etc.).

EXAMPLE 2

One part of NMA (Nadic Methyl Anhydride, methylbicyclo [2.2.1] hept-5-ene 2, 3 dicarboxylic anhydride) and 2 parts of CY 178 (manufactured by Ciba Products Co., and having the structure Bis (3, 4-epoxy-6-methylcyclohexylmethyl adipate), a cycloaliphatic epoxide resin, were blended with three parts of Epon U (manufactured by the Shell Chemical Co.), an aliphatic amine having a hydrogen equivalent weight, 45. The resultant mixture was spread onto copper and heated to 500°F along with 63/37 (Sn/Pb) solder. Due to its action, there was removed the copper surface tarnish and molten solder was permitted to metallurgically wet the surface. Upon cooling, the mixture cross-linked to a thermosetting film.

The above mixture ratios were found to be effective for their purpose. However, within the skill of the art, the quantities of these materials can be varied to obtain various thermosetting film properties.

EXAMPLE 3

Several formulations comprising different ratios of the aforementioned Epon U or materials such as diethylamine, and NMA were mixed together (1 to 3), the resulting fluxes being very effective, in their promotion of solder-substrate wetting.

EXAMPLE 4

Various ratios of Epon 828 (manufactured by the Shell Chemical Co.,) a diglycidal ether of bisphenol-A-epoxide resin diluted with butyl glyicdol ether and acryloid AT70 and AT75, carboxylated acrylic resins (manufactured by Rohm & Haas) were prepared. These resins permitted good solder-substrate wetting and produced resultant thermosetting films.

In the foregoing examples, viz., (1, 2, 3, & 4) organic solvents may be incorporated thereinto to reduce liquid viscosity in order to facilitate the handling thereof.

EXAMPLE 5

A mixture of 100 grams of the above-mentioned Epon 828 and 4 grams of DMP-30 was prepared. This mixture was then further mixed in various ratios with Hystl C-1000, a carboxy terminated polybutadiene resin. This resultant mixture provided good solder spreading on and wetting of the copper substrate when the Hystl ratio equalled or exceeded 200 parts per hundred of the epoxy resin mixture. Traces of solvents such as DMF (dimethyl formaldehyde), acetone, and butyl carbitol enhanced the solder spreading and wetting.

The mixtures hardened at solder temperatures to form a permanent flux. This permanent flux improved the physical strength of a solder joint and provided protection against environmental hazardous substances.

EXAMPLE 6

A mixture of 10 grams of HYSTl C-1000 and 0.1 gram of t-butyl perbenzoate was prepared. Solder melting, wetting and spreading occured at a hot plate temperature of 530°F gelling of the resin mix beginning 50 seconds after application. The resin mix was hard after 90 seconds to form a cross-linked resinous coating over the solder. Such coating served as a mechanical reinforcement to a solder joint in a permanent flux application. Other mixes were tried wherein t-butyl perbenzoate was presented in concentrations of 0.1 to 1 part per hundred in the total mix. These concentrations all produced effective soldering and the forming of the cross-linked resinous coating over the solder.

Among the synthetic polymers and materials mentioned hereinabove, the following sets forth their identifications.

Versamid - polyamide resin produced by the combination of polycarboxylic acids with polyamines.

Epon 815 & Epon 828 - A condensation polymer of epichlorohydrin and bisphenol-A.

Emerez - Distilled animal and vegetable fatty acids and oleic and stearic acid esters.

DDSA - Dodecyl succinic anhydride.

HYSTL C-1000 - A carboxyl terminated polybutadiene resin.

Ajicure - Proprietary heterocyclic diamine.

Acryloid - Acrylic ester-acid in organic solvent solution.

HYCAR - Co-polymer of butadiene and acrylonitrile.

DMP 30 - Substituted aminomethyl phenol (curing agent for epoxy resin)

GM Isocyanate -Isocyanate terminated aliphatic.

While the invention has been particularly shown and described with reference to preferred embodiments thereof, it will be understood by those skilled in the art that the foregoing and other changes in form and details may be made therein without departing from the spirit and scope of the invention.

We claim:

1. In a soldering process for jointing a plurality of metals wherein a flux is employed in said process to remove metallic oxides from the surfaces of said metals to be joined by said process and to promote metallurgical wetting of said metals, the improvement which comprises the step of:

using as a flux in said soldering process, a synthetic polymer and other materials selected from the group consisting of a carboxy terminated polybutadiene, a carboxy terminated polyisobutylene, a mercaptan terminated polybutadiene, metylbicyclo [2.2.1] hept-5-ene 2, 3 dicarboxylic anhydride and butyl carbitol, and a heterocyclic diamine.

2. In a soldering process for joining a plurality of metals wherein a flux is employed in said process to remove metallic oxides from the surfaces of said metals to be joined by said process and to promote metallurgical wetting of said metals, the improvement which comprises the step of:

using as a flux in aid soldering process, synthetic polymers selected from the group consisting of;

a mixture of carboxy terminated co-polymer of butadiene and acrylonitrile, a condensation polymer of epichlorohydrin and bisphenol-A, and a substituted amino methyl phenol, a mixture of a carboxy terminated polybutadiene and organic peroxides, a mixture of a carboxy-terminated polybutadiene resin, a heterocyclic diamine, methyl-bicyclo [2.2.1] hept-5-ene 2, 3 discarboxylic anhydride, a condensation polymer of epichlorohydrin and bisphenol-A, and a mixture of an acrylic ester-acid and a condensation polymer of epichlorohydrin and bisphenol-A.

3. In a soldering process for joining a plurality of metals wherein a flux is employed in said process to remove metallic oxides from the surfaces of said metals to be joined by said process and to promote metallurgical wetting of said metals, the improvement which comprises the step of:

using as a flux in said soldering process, a heterocyclic diamine, and a diglycidal ether of bisphenol-A-epoxide resin diluted with butyl glyicdol ether.

4. In a soldering process for joining a plurality of metals wherein a flux is employed in said process to remove metallic oxides from the surfaces of said metals to be joined by said process and to promote metallurgical wetting of said metals, the improvement which comprises the step of:

using as a flux in said soldering process, methyl-bicyclo [2.2.1] hept-5-ene 2, 3 dicarboxylic anhydride, and bis (3, 4-epoxy-6-methylcyclohexylmethyl adipate) and diethyltriamine.

5. In a soldering process for joining a plurality of metals wherein a flux is employed in said process to remove metallic oxides from the surfaces of said metals to be joined by said process and to promote metallurgical wetting of said metals, the improvement which comprises the step of:

using as a flux in said soldering process, methyl-bicyclo [2.2.1] hept-5-ene 2, 3 dicarboxylic anhydride, and diethyltriamine.

6. In a soldering process for joining a plurality of metals wherein a flux is employed in said process to remove metallic oxides from the surfaces of said metals to be joined by said process and to promote metallurgical wetting of said metals, the improvement which comprises the step of:

using as a flux in said soldering process, a diglycidal ether of bisphenol-A-epoxide resin diluted with butyl glyicdol ether and a carboxylated acrylic resin.

7. In a soldering process for joining a plurality of metals wherein a flux is employed in said process to remove metallic oxides from the surfaces of said metals to be joined by said process and to promote metallurgical wetting of said metals, the improvement which comprises the step of:

using as a flux in said soldering process, the mixture of a diglycidal ether of bisphenol-A-epoxide resin diluted with butyl glyicdol ether, a substituted aminomethyl phenol, and a carboxy terminated polybutadiene resin.

8. In a soldering process for joining a plurality of metals wherein a flux is employed in aid process to remove metallic oxides from the surfaces of said metals to be joined by said process and to promote metallurgical wetting of said metals, the improvement which comprises the step of:

using as flux in said soldering process, a mixture of a carboxy terminated polybutadiene resin and t-butyl perbenzoate.

* * * * *